US011479060B2

(12) United States Patent
Suzuki

(10) Patent No.: US 11,479,060 B2
(45) Date of Patent: Oct. 25, 2022

(54) AXLE BEAM

(71) Applicant: ISUZU MOTORS LIMITED, Tokyo (JP)

(72) Inventor: Kenta Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 52 days.

(21) Appl. No.: 16/978,621

(22) PCT Filed: Mar. 5, 2019

(86) PCT No.: PCT/JP2019/008647
§ 371 (c)(1),
(2) Date: Sep. 4, 2020

(87) PCT Pub. No.: WO2019/172259
PCT Pub. Date: Sep. 12, 2019

(65) Prior Publication Data
US 2020/0406680 A1    Dec. 31, 2020

(30) Foreign Application Priority Data
Mar. 7, 2018    (JP) .............................. JP2018-040701

(51) Int. Cl.
*B60B 35/04*    (2006.01)
*B60B 35/00*    (2006.01)
(Continued)

(52) U.S. Cl.
CPC ............ *B60B 35/04* (2013.01); *B60B 35/004* (2013.01); *B60G 9/04* (2013.01); *B60G 11/04* (2013.01)

(58) Field of Classification Search
CPC ....... B60B 35/04; B60B 35/004; B60B 35/06; B60G 9/04; B60G 11/04; B60G 9/027; B60G 2206/30; B60G 2202/31; B21K 1/12; B21K 1/06; E04C 2003/0452
See application file for complete search history.

(56) References Cited

U.S. PATENT DOCUMENTS 2,044,389 A * 6/1936 Kay .................. B60B 35/04
301/124.1
5,741,027 A * 4/1998 Stroh .................... B60B 35/06
180/905
(Continued)

FOREIGN PATENT DOCUMENTS

EP    0059038 A2 *  9/1982
EP    1749678 A1 *  2/2007    ........... B60B 35/007
(Continued)

OTHER PUBLICATIONS

Machine Translation of EP1749678 (Year: 2007).*
(Continued)

*Primary Examiner* — Paul N Dickson
*Assistant Examiner* — Kurtis Nielson
(74) *Attorney, Agent, or Firm* — Procopio, Cory, Hargreaves & Savitch LLP

(57) ABSTRACT

This axle beam is provided with a pair of horizontal plate sections separated vertically from and facing each other; and a vertical plate section extending vertically so as to connect intermediate sections, in a front-rear direction, of the pair of horizontal plate sections. The horizontal plate section on the upper side has a forwardly extending upper front plate section and a rearwardly extending upper rear plate section, and the horizontal plate section on the lower side has a forwardly extending lower front plate section and a rearwardly extending lower rear plate section. One of the upper front plate section, the upper rear plate section, the lower front plate section, and the lower rear plate section is set to have a smaller length in the front-rear direction than the other three plate sections, and among the other three plate sections, the two plate sections which are separated vertically from and facing each other are set to have substantially the same length in the front-rear direction.

1 Claim, 8 Drawing Sheets

(51) Int. Cl.
*B60G 9/04* (2006.01)
*B60G 11/04* (2006.01)

(56) References Cited

U.S. PATENT DOCUMENTS

| | | | | |
|---|---|---|---|---|
| 6,196,563 | B1* | 3/2001 | Haycraft | B60B 35/08 |
| | | | | 301/124.1 |
| 6,543,857 | B1* | 4/2003 | Griffiths | B60B 35/08 |
| | | | | 301/124.1 |
| 9,527,368 | B2* | 12/2016 | Raymond | B60G 21/051 |
| 2006/0211531 | A1* | 9/2006 | Okamuro | B60K 17/16 |
| | | | | 475/230 |
| 2015/0048583 | A1* | 2/2015 | Li | B60B 35/003 |
| | | | | 280/93.512 |
| 2015/0352922 | A1* | 12/2015 | Kawachi | B60G 21/051 |
| | | | | 301/124.1 |
| 2019/0389251 | A1* | 12/2019 | Imanishi | B60B 35/06 |

FOREIGN PATENT DOCUMENTS

| | | | | |
|---|---|---|---|---|
| EP | 1749678 | A1 | 2/2007 | |
| EP | 2163401 | A1 * | 3/2010 | B60B 35/06 |
| EP | 2163401 | A1 | 3/2010 | |
| JP | S58-002221 | A | 1/1983 | |
| JP | S58164907 | U | 11/1983 | |
| JP | H09188116 | A * | 7/1997 | |
| JP | H10-119504 | A | 5/1998 | |
| JP | 2002-114003 | A | 4/2002 | |
| WO | WO-9837287 | A1 * | 8/1998 | E04B 5/40 |

OTHER PUBLICATIONS

Machine Translation of EP2163401 (Year: 2010).*
International Search Report for related PCT App No. PCT/JP2019/008647 dated Apr. 9, 2019, 7 pgs. (partial translation).
Japanese Patent Office, Notice of Reasons for Refusal, Application No. JP 2018-040701, dated Nov. 25, 2021, in 12 pages.

* cited by examiner

[Fig. 1]
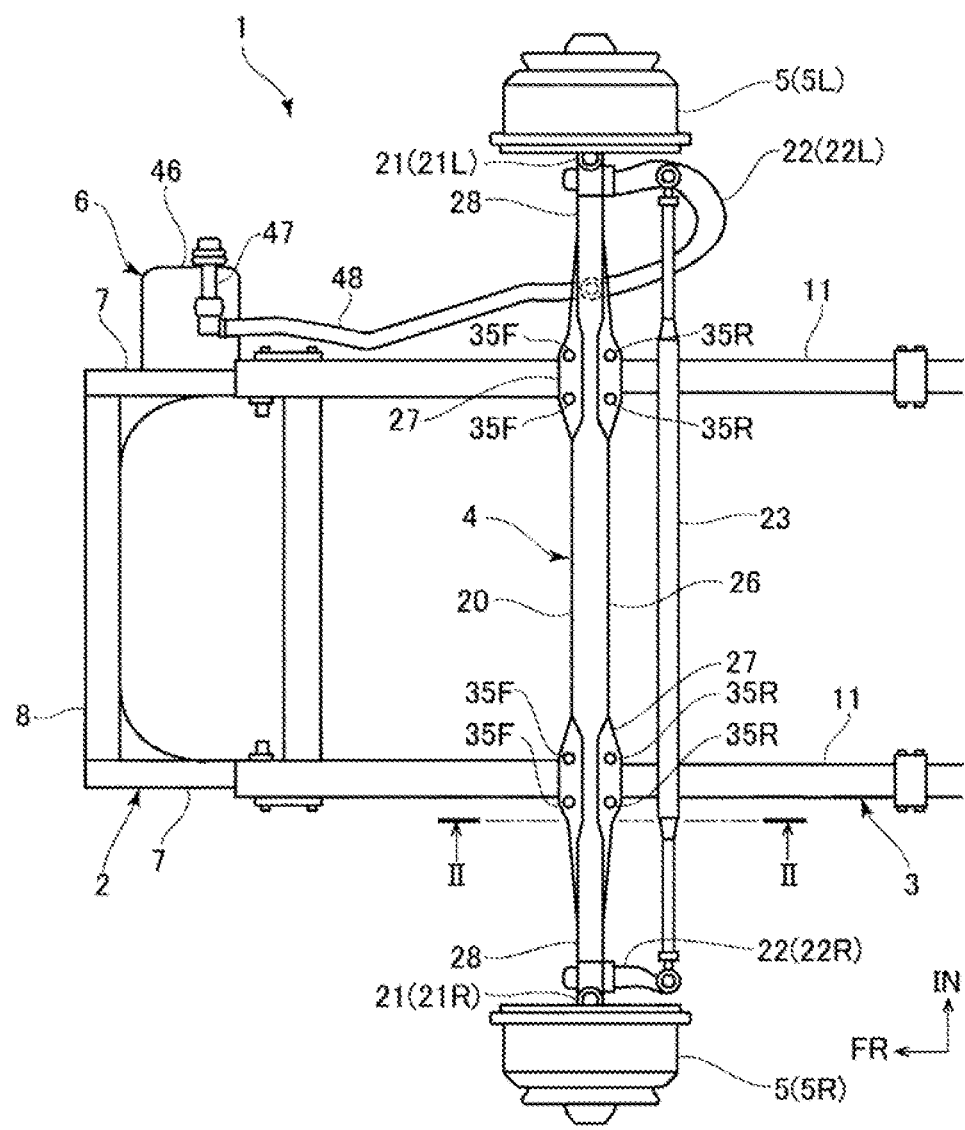

[Fig. 2]
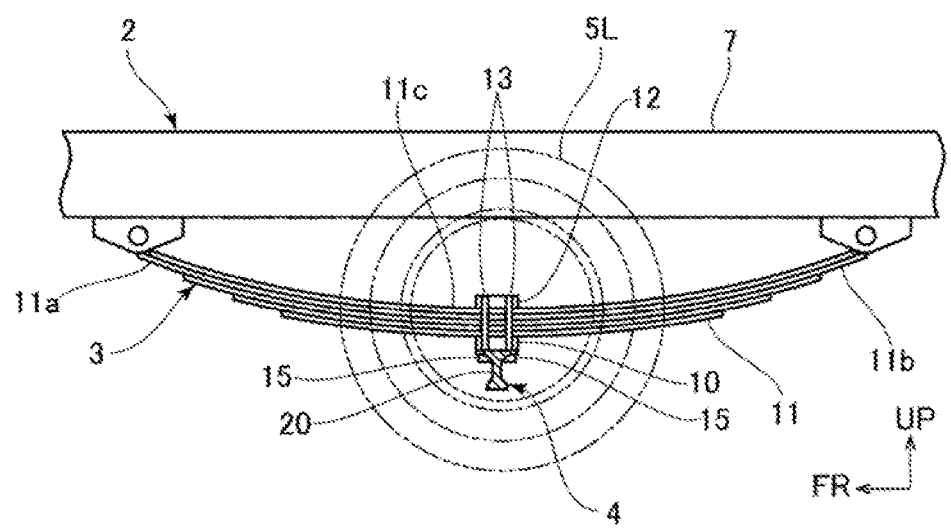

[Fig. 3]
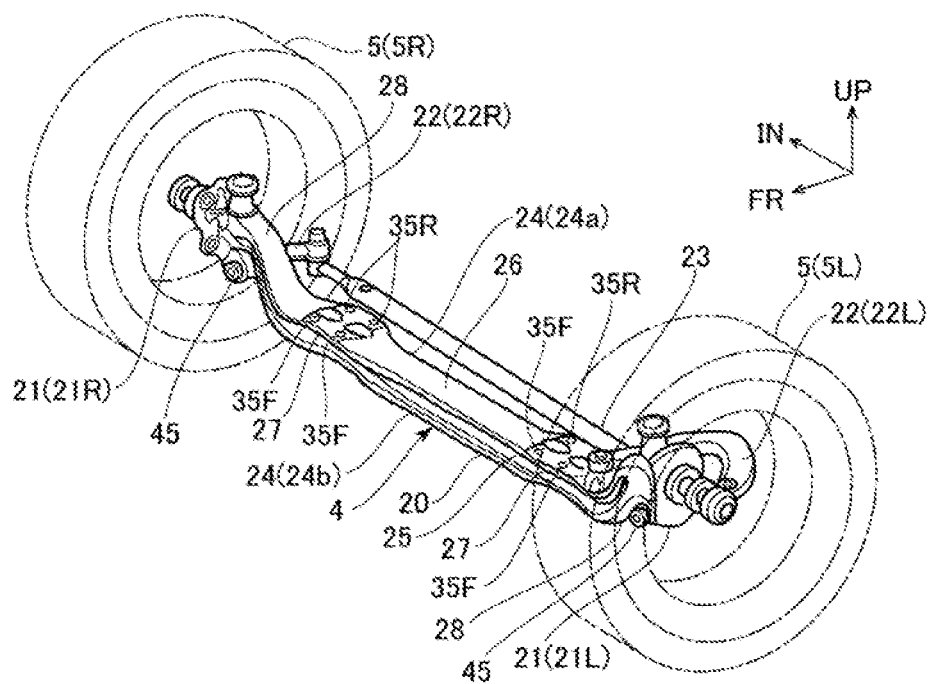

[Fig. 4]
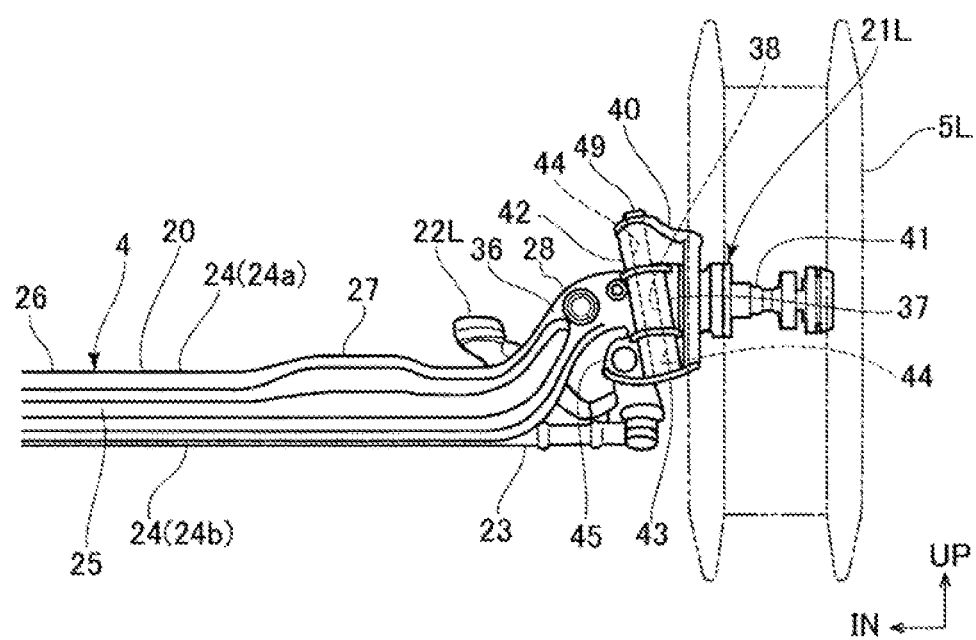

[Fig. 5]
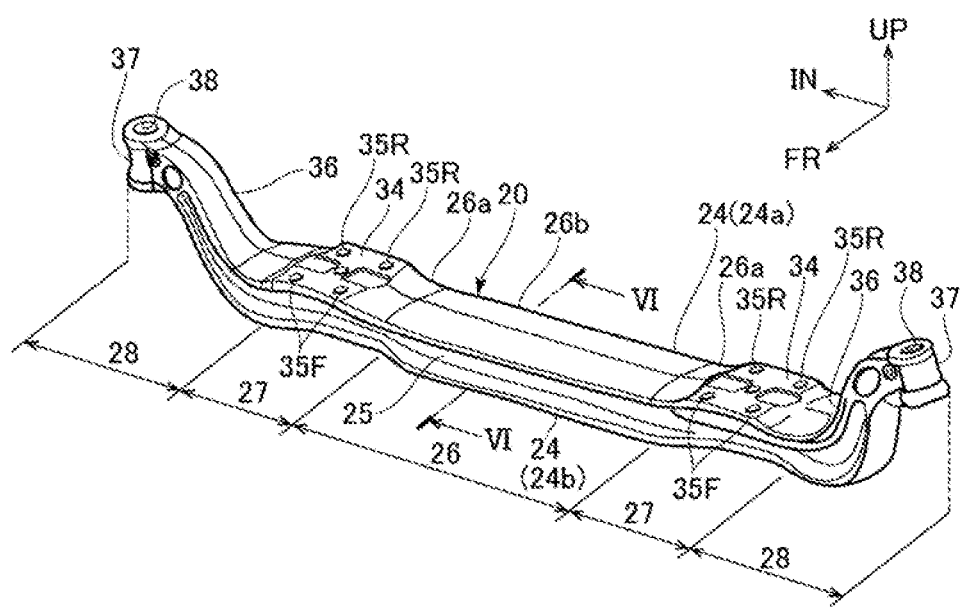

[Fig. 6]
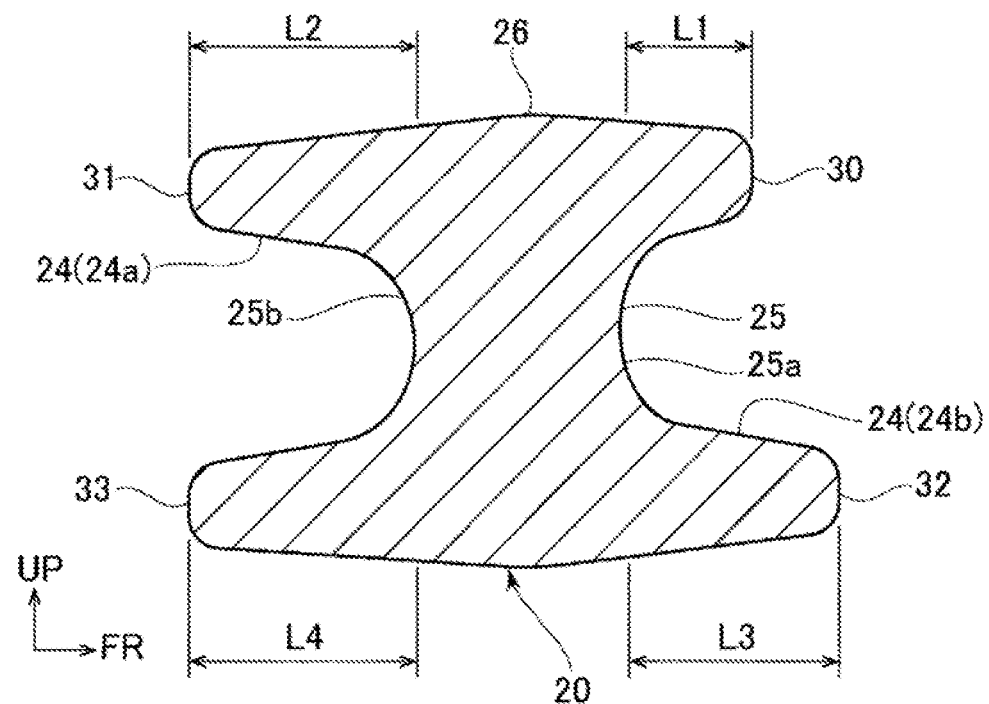

[Fig. 7]
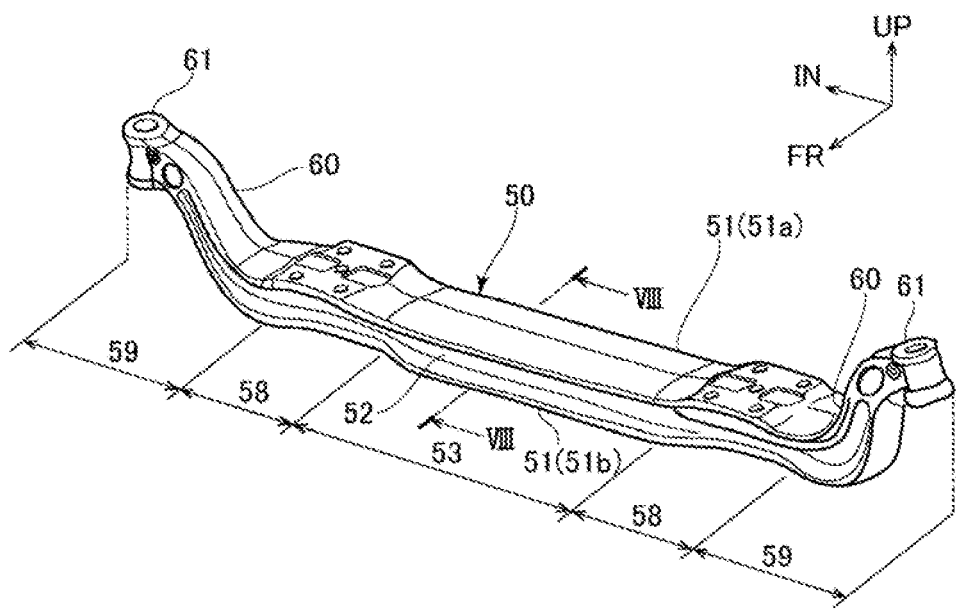

[Fig. 8]
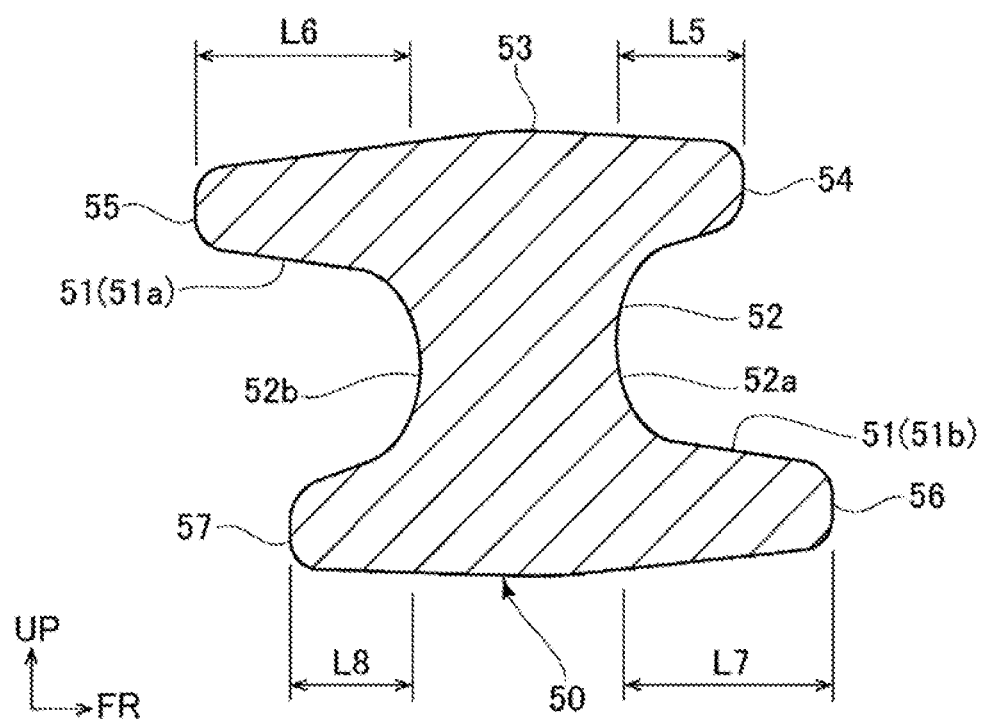

AXLE BEAM

TECHNICAL FIELD

The present disclosure relates to an axle beam.

BACKGROUND ART

PTL 1 discloses a structure of a front axle beam configured with an I-shaped steel material. An upper surface of the axle beam is formed with a pair of left and right spring seat surfaces, and both ends thereof are formed with kingpin holes opened for connection with wheels. The spring seat surfaces are placed thereon with leaf springs, respectively, which are attached to the axle beam by U-shaped bolts or the like. The leaf spring is connected to a fame by a shackle or the like. A cross-section of the axle beam between the spring seat surfaces is formed such that a cross-sectional shape of an upper part with respect to a substantial center in a vertical direction is smaller than a cross-sectional shape of a lower part therewith.

CITATION LIST

Patent Literature

PTL 1: JP-U-Sho58-164907

SUMMARY OF INVENTION

Technical Problem

In a vehicle having the front axle beam (axle beam) disclosed in PTL 1, when the vehicle is suddenly braked (hereinbelow, referred to as during a sudden vehicle braking), the frame may be moved forward due to an inertia with respect to a decelerating wheel-side. Therefore, a forward load is input from a frame-side (vehicle body-side) to the spring seat surfaces of the axle beam. As a result, the axle beam may be curved in an arch shape such that a center-side of the axle beam in a vehicle width direction protrudes forward.

By the way, the vehicle has a steering mechanism where wheels on both sides of the axle beam in the vehicle width direction are coupled by a link rod, one end-side of a knuckle arm is coupled to the wheel on one side in the vehicle width direction, the other end-side of the knuckle arm is coupled to a steering device on the vehicle body-side, and the steering device is operated to move the other end-side of the knuckle arm in a front and rear direction, thereby steering the wheels right and left. In the vehicle, as described above, during the sudden vehicle braking, when the axle beam is curved in an arch shape such that the center-side of the axle beam in the vehicle width direction protrudes forward, a relative position between the vehicle body-side on which the steering device is provided and the wheels-side on both sides of the axle beam in the vehicle width direction is displaced in the front and rear direction. Therefore, a relative position between the wheel and the other end-side of the knuckle arm is displaced in the front and rear direction, so that the wheel may be steered toward one side of the left and right sides. The more the axle beam is curved forward in the arch shape, the relative position between the wheel and the other end-side of the knuckle arm is more largely displaced in the front and rear direction, so that a steering angle of the wheel increases. Therefore, it may be necessary for a driver to perform an operation of correcting the direction of the wheel.

The present disclosure is to provide an axle beam capable of suppressing steering of a wheel due to displacement of a relative position between a vehicle body-side and a wheel-side during the sudden vehicle braking.

Solution to Problem

A first aspect of the present invention provides an axle beam having left and right wheel support parts configured to support wheels, and left and right vehicle body support parts provided between the left and right wheel support parts and configured to support a vehicle body from below, and extending in a vehicle width direction below the vehicle body. The axle beam includes a pair of horizontal plate parts and a vertical plate part. The pair of horizontal plate parts extends in the vehicle width direction between the left and right vehicle body support parts with being spaced vertically from and facing each other. The pair of horizontal plate parts has an upper horizontal plate part and a lower horizontal plate part. The vertical plate part extends in the vehicle width direction between the upper and lower horizontal plate parts and extends vertically so as to couple intermediate portions, in a front and rear direction, of the upper and lower horizontal plate parts. The upper horizontal plate part has an upper front plate part extending forward from the vertical plate part and an upper rear plate part extending rearward from the vertical plate part. The lower horizontal plate part has a lower front plate part extending forward from the vertical plate part and a lower rear plate part extending rearward from the vertical plate part. One plate part of the upper front plate part, the upper rear plate part, the lower front plate part and the lower rear plate part is set to have a length in the front and rear direction smaller than each length of the other three plate parts. Two plate parts spaced vertically from and facing each other of the other three plate parts are set to have substantially the same length in the front and rear direction.

In the above configuration, the axle beam has the left and right wheel support parts configured to support wheels, and the left and right vehicle body support parts provided between the left and right wheel support parts and configured to support the vehicle body from below. Therefore, during a sudden vehicle braking, when the vehicle body-side may be moved forward due to an inertia with respect to the decelerating wheels, a forward load is input to the vehicle body support parts of the axle beam. The length in the front and rear direction of one plate part of the upper front plate part, the upper rear plate part, the lower front plate part and the lower rear plate part (hereinbelow, referred to as "one plate part") of the upper and lower horizontal plate parts of the axle beam is set to be shorter than each length in the front and rear direction of the other three plate parts. Therefore, a cross-sectional shape of the axle beam is asymmetrical in the front and rear direction. When the cross-sectional shape of the axle beam is asymmetrical in the front and rear direction, during the sudden vehicle braking, the axle beam can be easily curved in an arch shape (hereinbelow, simply referred to as 'curved') such that a center-side of the axle beam in the vehicle width direction protrudes obliquely-upper-forward or obliquely-lower-forward along a diagonal line between the one plate part and the plate part provided diagonally to the one plate part, because the lengths in the front and rear direction of the two plate parts spaced vertically from and facing each other of the other three plate parts are set to be substantially the same. When the axle beam is curved such that the center-side thereof in the vehicle width direction protrudes obliquely-upper-forward or obliquely-lower-forward, the vehicle body support part moves obliquely-upper-forward or obliquely-lower-forward with respect to the wheel support part, so that displacement in the front and rear direction of a relative position between the vehicle body support part and the wheel support part is smaller, as compared to a case where the axle beam is curved such that the center-side thereof in the vehicle width direction protrudes forward substantially horizontally. Therefore, in a vehicle where wheels on both sides of the axle beam in the vehicle width direction are coupled by a link rod, one end-side of a knuckle arm is coupled to the wheel on one side in the vehicle width direction, the other end-side of the knuckle arm is coupled to a steering device of the vehicle body-side, and the steering device is operated to move the other end-side of the knuckle arm in the front and rear direction, thereby steering the wheels right and left, during the sudden vehicle braking, displacement in the front and rear direction of the relative position between the vehicle body and the wheels can be reduced. As a result, it is possible to suppress the steering of the wheels due to deformation of the axle beam.

In a second aspect of the present invention according to the first aspect, the one plate part, which is set to have the smaller length, of the upper front plate part, the upper rear plate part, the lower front plate part and the lower rear plate part is set to the upper front plate part or the lower rear plate part.

In the above configuration, since the one plate part, which is set to have the smaller length, of the upper front plate part, the upper rear plate part, the lower front plate part and the lower rear plate part is set to the upper front plate part or the lower rear plate part, during the sudden vehicle braking, the axle beam can be easily curved such that the center-side thereof in the vehicle width direction protrudes obliquely-upper-forward along a diagonal line between the upper front plate part and the lower rear plate part. For this reason, during the sudden vehicle braking, when the downward load is input from the vehicle body-side to the vehicle body support parts of the axle beam, the downward curving amount (bending) of the center-side of the axle beam in the vehicle width direction can be suppressed, so that variations in camber angle of the left and right wheels attached to the wheel support parts of the axle beam can be suppressed. Therefore, during the sudden vehicle braking, it is possible to suppress the lowering in straight traveling stability of the vehicle due to the variations in camber angle of the left and right wheels.

A third aspect of the present invention provides an axle beam having left and right wheel support parts configured to support wheels, and left and right vehicle body support parts provided between the left and right wheel support parts and configured to support a vehicle body from below, and extending in a vehicle width direction below the vehicle body. The axle beam includes a pair of horizontal plate parts and a vertical plate part. The pair of horizontal plate parts extends in the vehicle width direction between the left and right vehicle body support parts with being spaced vertically from and facing each other. The vertical plate part extends in the vehicle width direction between the upper and lower horizontal plate parts and extends vertically so as to couple intermediate portions, in a front and rear direction, of the upper and lower horizontal plate parts. The pair of horizontal plate parts has an upper horizontal plate part and a lower horizontal plate part. The upper horizontal plate part has an upper front plate part extending forward from the vertical plate part and an upper rear plate part extending rearward from the vertical plate part. The lower horizontal plate part has a lower front plate part extending forward from the vertical plate part and a lower rear plate part extending rearward from the vertical plate part. Two plate parts, which are diagonally provided, of the upper front plate part, the upper rear plate part, the lower front plate part and the lower rear plate part are set to have lengths in the front and rear direction smaller than the other two plate parts.

In the above configuration, the axle beam has the left and right wheel support parts configured to support wheels, and the left and right vehicle body support parts provided between the left and right wheel support parts and configured to support the vehicle body from below. Therefore, during the sudden vehicle braking, when the vehicle body-side may be moved forward due to the inertia with respect to the decelerating wheels, the forward load is input to the vehicle body support parts of the axle beam. The lengths in the front and rear direction of the two plate parts of the upper front plate part, the upper rear plate part, the lower front plate part and the lower rear plate part (hereinbelow, referred to as "diagonal plate parts") of the upper and lower horizontal plate parts of the axle beam are set to be shorter than the lengths in the front and rear direction of the other two plate parts. Therefore, a cross-sectional shape of the axle beam is asymmetrical in the front and rear direction. When the cross-sectional shape of the axle beam is asymmetrical in the front and rear direction, during the sudden vehicle braking, the axle beam can be easily curved such that the center-side of the axle beam in the vehicle width direction protrudes obliquely-upper-forward or obliquely-lower-forward along a diagonal line between the diagonal plate parts. For this reason, when the axle beam is curved such that the center-side thereof in the vehicle width direction protrudes obliquely-upper-forward or obliquely-lower-forward, the vehicle body support part moves obliquely-upper-forward or obliquely-lower-forward with respect to the wheel support part, so that displacement in the front and rear direction of a relative position between the vehicle body support part and the wheel support part is smaller, as compared to a case where the axle beam is curved such that the center-side thereof in the vehicle width direction protrudes forward substantially horizontally. Therefore, in a vehicle where wheels on both sides of the axle beam in the vehicle width direction are coupled by a link rod, one end-side of a knuckle arm is coupled to the wheel on one side in the vehicle width direction, the other end-side of the knuckle arm is coupled to a steering device of the vehicle body-side, and the steering device is operated to move the other end-side of the knuckle arm in the front and rear direction, thereby steering the wheels right and left, during the sudden vehicle braking, displacement in the front and rear direction of the relative position between the vehicle body and the wheels can be reduced. As a result, it is possible to suppress the steering of the wheels due to deformation of the axle beam.

In a fourth aspect of the present invention according to the third aspect, the two plate parts, which are set to have the smaller lengths in the front and rear direction than the other two plate parts, are set to the upper front plate part and the lower rear plate part.

In the above configuration, since the two plate parts, which are set to have the smaller lengths in the front and rear direction than the other two plate pans, are set to the upper front plate part and the lower rear plate part, during the sudden vehicle braking, the axle beam can be easily curved such that the center-side thereof in the vehicle width direction protrudes obliquely-upper-forward along the diagonal line between the upper front plate part and the lower rear plate part. For this reason, during the sudden vehicle braking, when the downward load is input from the vehicle body-side to the vehicle body support parts of the axle beam, the downward curving amount (bending) of the center-side of the axle beam in the vehicle width direction can be suppressed, so that variations in camber angle of the left and right wheels attached to the wheel support parts of the axle beam can be suppressed. Therefore, during the sudden vehicle braking, it is possible to suppress the lowering in straight traveling stability of the vehicle due to the variations in camber angle of the left and right wheels.

Advantageous Effects of Invention

According to the present invention, during the sudden vehicle braking, it is possible to suppress the steering of the wheels due to the displacement of the relative position between the vehicle body-side and the wheel-side.

BRIEF DESCRIPTION OF DRAWINGS

FIG. 1 is a schematic bottom view of a vehicle including a front axle beam in accordance with a first embodiment.

FIG. 2 is a sectional view taken along an II-II arrow direction in FIG. 1, depicting the front axle beam and a leaf suspension of FIG. 1.

FIG. 3 is a perspective view depicting a front axle of FIG. 2.

FIG. 4 is a front view of front parts depicting the front axle of FIG. 2.

FIG. 5 is a perspective view depicting the front axle beam of FIG. 4.

FIG. 6 is a sectional view taken along a VI-VI arrow direction in FIG. 5.

FIG. 7 is a perspective view depicting a front axle beam in accordance with a second embodiment.

FIG. 8 is a sectional view taken along a VIII-VIII arrow direction in FIG. 7.

DESCRIPTION OF EMBODIMENTS

Hereinbelow, an axle beam in accordance with a first embodiment of the present invention will be described in detail with reference to the drawings. In the respective drawings, FR indicates a front direction of the vehicle, UP indicates an upper direction, and TN indicates an inner direction in a vehicle width direction. Also, in descriptions below, a right and left direction means the right and left direction when the vehicle is oriented to the front. Also, a front and rear direction means the front and rear direction of the vehicle, and a vertical direction means the vertical direction of the vehicle.

As shown in FIG. 1, a vehicle 1 in accordance with the present embodiment is a vehicle such as a trick, and includes a vehicle body frame (vehicle body) 2, leaf suspensions 3, a front axle 4, front wheels (wheels) 5 each of which is attached to both end portions of the front axle 4 in the vehicle width direction, and a steering device 6. The left and right front wheels 5 of the vehicle 1 are coupled by a link rod 23 (which will be described later), one end-side of a left knuckle arm 22L is coupled to the left front wheel 5L, the other end-side of the left knuckle arm 22L is coupled to the steering device 6 on the vehicle body-side, the steering device 6 is operated to move the other end-side of the left knuckle arm 22L in the front and rear direction, thereby steering the front wheels 5 right and left.

The vehicle body frame 2 has a pair of left and right side members 7 extending in the front and rear direction on both sides in the vehicle width direction, and a plurality of cross members 8 extending in the vehicle width direction and coupling the left and right side members 7. The front axle 4 extends in the vehicle width direction below the side members 7, and elastically supports the left and right side members 7 via the leaf suspensions 3. The left and right front wheels 5 are attached to both end portions in the vehicle width direction of a front axle beam (axle beam) 20 (which will be described later) of the front axle 4. In the meantime, FIG. 2 depicts the left side member 7, the left leaf suspension 3, and the left front wheel 5L.

As shown in FIGS. 1 and 2, the leaf suspension 3 is interposed between the side member 7 and the front axle 4, and has a spacer 10, a leaf spring 11, a crank plate 12, and front and rear U-shaped bolts 13. The spacer 10 has a plate shape, and is placed on the front axle 4 from above. The leaf spring 11 has a configuration where a plurality of long leaf springs having lengths different from each other is laminated vertically, and extends in the front and rear direction below a lower surface of the side member 7 with being spaced from the side member 7. A front end portion 11a and a rear end portion 11b of the leaf spring 11 are each supported to the side member 7 so as to be rotatable about an axis of rotation extending in the vehicle width direction, and a central portion 11c of the leaf spring 11 is placed on the front axle 4 from above via the plate-shaped spacer 10. The crank plate 12 has a plate shape and is placed on the central portion 11c of the leaf spring 11 from above. A vehicle body support part 27 (which will be described later) of the front axle 4 is formed with left and right bolt insertion holes 35F on the front side and left and right bolt insertion holes 35R on the rear side. The front and rear U-shaped bolts 13 inserted into the front and rear bolt insertion holes 35F and 35R with being bridged to the crank plate 12 are fastened with nuts 15, whereby the front axle 4 is coupled to the leaf suspension 3.

As shown in FIGS. 3 to 5, the front axle 4 has a front axle beam 20 extending in the vehicle width direction, a pair of left and right knuckles 21 attached to both sides of the front axle beam 20 in the vehicle width direction, a pair of left and right knuckles arms 22 attached to the left and right knuckles 21, and a link rod 23 coupling the left and right knuckles arms 22.

The front axle beam 20 has a horizontal part 26 extending substantially horizontally in the vehicle width direction below the vehicle body frame 2, left and right vehicle body support parts 27 extending outward in the vehicle width direction from both ends of the horizontal part 26 in the vehicle width direction, and left and right outer end parts 28 extending outward in the vehicle width direction from both ends of the vehicle body support parts 27 in the vehicle width direction. The horizontal part 26, the left and right vehicle body support parts 27, and inclination portions 36 (which will be described later) of the left and right outer end parts 28 of the front axle beam 20 are formed to have a substantially I-shaped section by a pair of upper and lower horizontal plate parts 24 having a substantial plate shape extending in the vehicle width direction (extension direction) with being spaced vertically from and facing each other and a vertical plate part 25 having a substantial plate shape, disposed between the upper and lower horizontal plate parts 24 and erected along the vehicle width direction to couple the upper and lower horizontal plate parts 24.

As shown in FIGS. 5 and 6, an upper end edge of the vertical plate part 25 continues from a lower surface of an upper horizontal plate part 24a of the horizontal part 26. The upper horizontal plate part 24a of the horizontal part 26 has an upper front plate part 30 extending forward from the vertical plate part 25 and an upper rear plate part 31 extending rearward from the vertical plate part 25. An upper surface (a surface opposite to the vertical plate part 25) of the upper horizontal plate part 24a of the horizontal part 26 has the highest apex portion at a substantially central portion in the front and rear direction, and is inclined front-downward and rear-downward from the apex portion. A lower surface (a surface facing the vertical plate part 25) of the upper front plate part 30 extends front-upward from the vertical plate part 25. A lower surface (a surface facing the vertical plate part 25) of the upper rear plate part 31 extends rear-upward from the vertical plate part 25. A lower end edge of the vertical plate part 25 continues from an upper surface of a lower horizontal plate part 24b of the horizontal part 26. The lower horizontal plate part 24b of the horizontal part 26 has a lower front plate part 32 extending forward from the vertical plate part 25 and a lower rear plate part 33 extending rearward from the vertical plate part 25. A lower surface (a surface opposite to the vertical plate part 25) of the lower horizontal plate part 24b of the horizontal part 26 has the lowest apex portion at a substantially central portion in the front and rear direction, and is inclined front-upward and rear-upward from the apex portion. An upper surface (a surface facing the vertical plate part 25) of the lower front plate part 32 extends front-downward from the vertical plate part 25. An upper surface (a surface facing the vertical plate part 25) of the lower rear plate part 33 extends rear-downward from the vertical plate part 25. A front surface 25a of the vertical plate part 25 extends with being curved rearward from a rear end edge of the upper front plate part 30 toward a rear end edge of the lower front plate part 32. A rear surface 25b of the vertical plate part 25 extends with being curved forward from a front end edge of the upper rear plate part 31 toward a front end edge of the lower rear plate part 33.

Subsequently, a cross-sectional shape of the horizontal part 26 is described with reference to FIGS. 5 and 6. FIG. 6 is a sectional view of the horizontal part 26 of the front axle beam 20 taken at any position in a direction orthogonal to the vehicle width direction. The horizontal part 26 is formed to have a substantially I-shaped section by: the pair of upper and lower horizontal plate parts 24 having a substantial plate shape extending in the vehicle width direction with being spaced vertically from and facing each other; and the vertical plate part 25 having a substantial plate shape, disposed between the upper and lower horizontal plate parts 24 and erected along the vehicle width direction to couple the upper and lower horizontal plate parts 24. A length (an amount that protrudes rearward from the vertical plate part 25) L2 in the front and rear direction of the upper rear plate part 31 and a length (an amount that protrudes rearward from the vertical plate part 25) L4 in the front and rear direction of the lower rear plate part 33 are set to be substantially the same. A length (an amount that protrudes forward from the vertical plate part 25) L3 in the front and rear direction of the lower front plate part 32 is set to be slightly shorter than the length L2 in the front and rear direction of the upper rear plate part 31 and the length L4 in the front and rear direction of the lower rear plate part 33. A length (an amount that protrudes forward from the vertical plate part 25) L1 in the front and rear direction of the upper front plate part 30 is set to be shorter than the length L3 in the front and rear direction of the lower front plate part 32. Also, since the length L1 in the front and rear direction of the upper front plate part 30 is set to be shorter than the length L3 in the front and rear direction of the lower front plate part 32, a deformation mode of torsion deformation of the horizontal part 26 of the axle beam 20 is different from a case where the length L1 in the front and rear direction of the upper front plate part 30 is set to be substantially the same as the length L3 in the front and rear direction of the lower front plate part 32.

The upper horizontal plate part 24a of the left and right vehicle body support parts 27 is provided on its upper surface with a pair of left and right spring seat parts 34. The left and right spring seat parts 34 are each provided with left and right bolt insertion holes 35F on the front-side and left and right bolt insertion holes 35R on the rear-side, which penetrate in the vertical direction, are disposed below the left and right leaf springs 11, and are coupled to the left and right leaf springs 11 by fastening the front and rear U-shaped bolts 13 inserted in the left and right bolt insertion holes 35F and 35R on the front-side and on the rear-side with the nuts 15 (refer to FIG. 2). In the state where the left and right spring seat parts 34 are coupled to the left and right leaf springs 11, the front axle beam 20 supports the vehicle body frame 2 from below.

The left and right outer end parts 28 each have integrally an inclination portion 36 extending outward in the vehicle width direction from an outer end portion in the vehicle width direction of each of the left and right vehicle body support parts 27 and extending upward with being curved on the outer side in the vehicle width direction; and a wheel support part 37 extending upward on the outer-side in the vehicle width direction from an outer end portion in the vehicle width direction of the inclination portion 36, and protrude further outward in the vehicle width direction than the left and right side members 7. The left and right wheel support parts 37 are each formed with a beam-side pin insertion hole 38 in which a kingpin 49 (refer to FIG. 4) is inserted. The beam-side pin insertion hole 38 opens vertically with being inclined upward on the inner side in the vehicle width direction with respect to the horizontal direction, and is orthogonal to the direction in which the wheel support part 37 extends. Lengths in the front and rear direction of the upper and lower horizontal plate parts 24 of the inclination portion 36 are formed to be substantially the same.

A length in the front and rear direction of each of the left and right spring seat parts 34 is formed to be larger than a length in the front and rear direction of the upper horizontal plate part 24a. A length in the front and rear direction of each of both end portions 26a in the vehicle width direction of the upper horizontal plate part 24a of the horizontal part 26 gradually increases from the inner side in the vehicle width direction toward each of the left and right spring seat parts 34 on the outer side in the vehicle width direction, and a length in the front and rear direction of an intermediate portion 26b sandwiched between both end portions 26a in the vehicle width direction of the upper horizontal plate part 24a of the horizontal part 26 is formed to be substantially the same in the right and left direction. A length in the front and rear direction of a region, which is located below the left and right spring seat parts 34 of the upper horizontal plate part 24a, of the lower horizontal plate part 24b is formed to be shorter than a length in the front and rear direction of the lower horizontal plate part 24b (refer to FIG. 5). A length in the front and rear direction of each of both end portions 26a in the vehicle width direction of the lower horizontal plate part 24b of the horizontal part 26 gradually decreases from the inner side in the vehicle width direction toward each of the left and right spring seat parts 34 on the outer side in the vehicle width direction, and a length in the front and rear direction of an intermediate portion 26b sandwiched between both end portions 26a in the vehicle width direction of the lower horizontal plate part 24b of the horizontal part 26 is formed to be longer than the length in the front and rear direction of the intermediate portion 26b of the upper horizontal plate part 24a and to be substantially the same in the right and left direction. A length in the front and rear direction of the upper horizontal plate part 24a of an inner end portion in the vehicle width direction of the outer end part 28 gradually increases from the outer side in the vehicle width direction toward each of the left and right spring seat parts 34 on the inner side in the vehicle width direction. A length in the front and rear direction of the lower horizontal plate part 24b of the inner end portion in the vehicle width direction of the outer end part 28 gradually decreases from the outer side in the vehicle width direction toward a region located below the spring seat part 34 on the inner side in the vehicle width direction.

As shown in FIGS. 1 and 3 to 5, the left and right knuckles 21 each have: a beam attachment part 40 that is attached to the wheel support part 37 of the front axle beam 20 and a wheel attachment part 41 to which the front wheel 5 is attached from the outer side in the vehicle width direction. The beam attachment part 40 has an upper attachment part 42 that supports the wheel support part 37 of the front axle beam 20 from above and a lower attachment part 43 that supports the wheel support part 37 from below. The upper attachment part 42 and the lower attachment part 43 are each formed with a knuckle-side pin insertion hole 44 in which the kingpin 49 (which will be described later) is inserted. The knuckle-side pin insertion hole 44 opens vertically with being inclined upward on the inner side in the vehicle width direction with respect to the horizontal direction. In a state where the wheel support part 37 is sandwiched vertically by the upper attachment part 42 and the lower attachment part 43, the kingpin 49 is inserted into the beam-side pin insertion hole 38 of the wheel support part 37 and the knuckle-side pin insertion holes 44 of the upper attachment part 42 and the lower attachment part 43, so that the knuckle 21 is attached to the wheel support part 37. An inner end portion of the lower attachment part 43 in the vehicle width direction is provided with an arm attachment part 45 (which will be described later) to which a knuckle arm 22 is attached.

The left knuckle arm 22L has a U-shape that extends in the vehicle width direction and opens forward, and one end thereof on the outer side in the vehicle width direction is rotatably connected to a drag link 48 (which will be described later) and the other end on the inner side in the vehicle width direction is attached to the arm attachment part 45 of the left knuckle 21L. One end of the left knuckle arm 22L on the outer side in the vehicle width direction and the drag link 48 are connected to each other above the front axle beam 20 in a state where the left and right front wheels 5 are directed in the front and rear direction. The link rod 23 is rotatably connected to an intermediate portion of the left knuckle arm 22L. The left knuckle arm 22L operates in conjunction with advance or retreat of the drag link 48, thereby steering the left front wheel 5L and advancing or retreating the link rod 23.

The right knuckle am 22R has one end rotatably connected to the link rod 23 and the other end attached to the arm attachment part 45 of the right knuckle 21R. The right knuckle arm 22R rotates in conjunction with advance or retreat of the link rod 23, thereby steering the right front wheel 5R.

The link rod 23 extends in the vehicle width direction at the rear of the front axle beam 20. One end-side of the link rod 23 in the vehicle width direction is rotatably coupled to the intermediate portion of the left knuckle arm 22L, and the other end-side in the vehicle width direction is rotatably coupled to one end of the right knuckle arm 22R. The link rod 23 advances or retreats in conjunction with rotation of the left knuckle arm 22L, thereby steering the right knuckle arm 22R.

The left and right front wheels 5 are attached to the wheel attachment parts 41 of the left and right knuckles 21. The left and right front wheels 5 are supported to the wheel support parts 37 of the front axle beam 20 via the left and right knuckles 21, and are steered right and left about the kingpins 49. The front wheels 5 are attached to the front axle beam so as to be substantially orthogonal, as seen in the front and rear direction. An inclination angle of the front wheel 5 to a vertical line is referred to as a camber angle, when the vehicle 1 is seen in the front and rear direction. In a state (positive camber state) where an upper end portion of the front wheel 5 is inclined to the vertical line outward in the vehicle width direction and in a state (negative camber state) where the upper end portion of the front wheel is inclined relative to the vertical line inward in the vehicle width direction, the straight traveling stability of the vehicle 1 is lowered.

As shown in FIG. 1, the steering device 6 has a steering gear box 46 attached to an outer side in the vehicle width direction of a front end portion of the left side member 7, a pitman arm 47 coupled to an output shaft (not shown) of the steering gear box 46, and a drag link 48 coupled to the pitman arm 47. The steering gear box 46 is coupled with a lower end portion of a steering shaft (not shown), and is transmitted with rotation of a steering wheel (not shown) fixed to the steering shaft. The output shaft of the steering gear box 46 is tiltably coupled to one end-side of the pitman arm 47. The drag link 48 extends rearward with the other end-side of the pitman arm 47 being rotatably coupled to one end-side thereof, and one end of the left knuckle arm 22L is rotatably coupled to the other end-side of the drag link 48.

When the steering wheel is rotated counterclockwise, the rotation is transmitted to the steering gear box 46 via the steering shaft, so that the pitman arm 47 coupled to the output shaft of the steering gear box 46 is tilted obliquely-lower-forward about one end-side. Thereby, the drag link 48 is moved forward and the left knuckle arm 22L is pulled, so that the left front wheel 5L fixed to the left knuckle arm 22L via the left knuckle 21L is steered leftward about the kingpin 49. Also, the right front wheel 5R, which is fixed via the right knuckle 21R, to the right knuckle arm 22R coupled to the left knuckle arm 22L by the link rod 23 is also steered leftward. When the steering wheel is rotated clockwise, the rotation is transmitted to the steering gear box 46 via the steering shaft, so that the pitman arm 47 coupled to the output shaft of the steering gear box 46 is tilted obliquely lower-rearward about one end-side. Thereby, the drag link 48 is moved rearward and the left knuckle arm 22L is pushed out, so that the left front wheel 5L fixed to the left knuckle arm 22L via the left knuckle 21L is steered rightward about the kingpin 49. Also, the right front wheel 5R, which is fixed via the right knuckle 21R, to the right knuckle arm 22R coupled to the left knuckle arm 22L by the link rod 23 is also steered rightward.

According to the present embodiment, the front axle beam 20 has the left and right wheel support parts 37 that support the front wheels 5, and the left and right vehicle body support parts 27 that are provided between the left and right wheel support parts 37 and support the vehicle body from below. Therefore, during a sudden vehicle braking, when the vehicle body-side may be moved forward due to an inertia with respect to the decelerating front wheels 5-side, a forward load is input to the vehicle body support parts 27 of the front axle beam 20. The length L1 in the front and rear direction of the upper front plate part 30 of the upper and lower horizontal plate parts 24 of the front axle beam 20 is set to be shorter than the lengths L2, L3 and L4 in the front and rear direction of the upper rear plate part 31, the lower front plate part 32 and the lower rear plate part 33, and the lengths L2 and L4 in the front and rear direction of the upper rear plate part 31 and the lower rear plate part 33 spaced vertically from and facing each other are set to be substantially the same. Therefore, the cross-sectional shape of the front axle beam 20 is asymmetrical in the front and rear direction. As a result, during the sudden vehicle braking, the front axle beam 20 can be easily curved in an arch shape (hereinbelow, referred to as 'curved') such that the center-side of the front axle beam 20 in the vehicle width direction protrudes obliquely-upper-forward along a diagonal line between the upper front plate part 30 and the lower rear plate part 33. When the front axle beam 20 is curved such that the center-side thereof in the vehicle width direction protrudes obliquely-upper-forward, displacement in the front and rear direction of the relative position between the vehicle body support part 27 and the wheel support part 37 is smaller, as compared to a case where the front axle beam 20 is curved such that the center-side thereof in the vehicle width direction protrudes forward substantially horizontally. Therefore, in the vehicle 1 where the steering device 6 is operated to move the other end-side of the left knuckle arm 22L in the front and rear direction, thereby steering the front wheels 5 right and left, during the sudden vehicle braking, displacement in the front and rear direction of the relative position between the vehicle body and the front wheels 5 can be reduced. As a result, it is possible to suppress the steering of the wheels due to deformation of the front axle beam 20.

Also, in a vehicle including an automatic brake system, a driver's unintentional sudden braking may occur and a driver's correction of a wheel direction may be delayed. Therefore, a system for correcting the wheel direction during the sudden vehicle braking is provided, which may make the system complicated. According to the present disclosure, during the sudden braking by the automatic brake system, the driver's unintentional steering for the front wheels 5 is suppressed. Therefore, it is possible to avoid the situation where the system is complicated, such as a case where a system for correcting the direction of the front wheel 5 is provided.

Also, since the length L1 in the front and rear direction of the upper front plate part 30 is set to be shorter than each of the lengths L2, L3 and L4 in the front and rear direction of the upper rear plate part 31, the lower front plate part 32 and the lower rear plate part 33, during the sudden vehicle braking, the front axle beam 20 can be easily curved such that the center-side thereof in the vehicle width direction protrudes obliquely-upper-forward along the diagonal line between the upper front plate part 30 and the lower rear plate part 33. For this reason, during the sudden vehicle braking, when the downward load is input from the vehicle body-side to the vehicle body support parts 27 of the front axle beam 20, the downward curving amount (bending) of the center-side of the front axle beam 20 in the vehicle width direction can be suppressed, so that variations in camber angle of the left and right front wheels 5 attached to the wheel support parts 37 of the front axle beam 20 can be suppressed. Therefore, during the sudden vehicle braking, it is possible to suppress the lowering in straight traveling stability of the vehicle 1 due to the variations in camber angle of the left and right front wheels 5.

Also, since the length L1 in the front and rear direction of the upper front plate part 30 is set to be shorter than the length L3 in the front and rear direction of the lower front plate part 32, a weight can be reduced by the shortened portion. Also, when a thickness of the axle beam 20 is increased by the reduced weight, it is possible to reduce lowering in vertical bending stiffness of the horizontal part 26 of the axle beam 20 and to increase bending stiffness in the front and rear direction, as compared to a case where the length L1 in the front and rear direction of the upper front plate part 30 is set to be substantially the same as the length L3 in the front and rear direction of the lower front plate part 32.

In the present embodiment, the structure has been exemplified in which the lengths in the front and rear direction of the upper rear plate part 31, the lower front plate part 32 and the lower rear plate part 33 of the front axle beam 20 are set to be substantially the same and the length in the front and rear direction of the upper front plate part 30 is set to be shorter than the lengths in the front and rear direction of the upper rear plate part 31, the lower front plate part 32 and the lower rear plate part 33. However, the present invention is not limited thereto. For example, a structure is also possible in which the lengths in the front and rear direction of the upper front plate part 30, the upper rear plate part 31 and the lower front plate part 32 of the front axle beam 20 are set to be substantially the same and the length in the front and rear direction of the lower rear plate part 33 is set to be shorter than the lengths in the front and rear direction of the upper front plate part 30, the upper rear plate part 31 and the lower front plate part 32.

Also, in the present embodiment, the following structure of the cross-sectional shape of the horizontal part 26 of the axle beam 20 has been exemplified: the lengths L2 and L4 in the front and rear direction of the upper rear plate part 31 and the lower rear plate part 33 are set to be substantially the same; the length L3 in the front and rear direction of the lower front plate part 32 is set to be slightly shorter than the lengths L2 and L4 in the front and rear direction of the upper rear plate part 31 and the lower rear plate part 33; and the length L1 in the front and rear direction of the upper front plate part 30 is set to be shorter than the length L3 in the front and rear direction of the lower front plate part 32. However, the present invention is not limited thereto. For example, the structure may also be a cross-sectional shape of the horizontal part 26 and the vehicle body support part 27 of the axle beam 20.

Also, in the present embodiment, the axle beam has been applied to the front axle 4 of the vehicle 1 such as a truck. However, the present invention is not limited thereto and may also be applied to a structure for another vehicle.

Subsequently, an attachment structure of a vehicle-mounted component in accordance with a second embodiment of the present invention is described with reference to FIGS. 7 and 8. In the meantime, a front axle beam (axle beam) 50 in accordance with the present embodiment is different from the front axle beam 20 of the first embodiment, in terms of a cross-sectional shape of a horizontal part 53, and the similar configurations to the first embodiment are denoted with the same reference signs, and the descriptions thereof are omitted.

As shown in FIG. 7, the front axle beam 50 has: a horizontal part 53 extending substantially horizontally in the vehicle width direction below the vehicle body frame 2; left and right vehicle body support parts 58 extending outward in the vehicle width direction from both ends of the horizontal part 53 in the vehicle width direction; and left and right outer end parts 59 extending outward in the vehicle width direction from both ends of the vehicle body support parts in the vehicle width direction. The left and right outer end parts 59 each have integrally: an inclination portion 60 extending outward in the vehicle width direction from an outer end portion in the vehicle width direction of each of the left and right vehicle body support parts 58 and extending upward with being curved on the outer side in the vehicle width direction; and a wheel support part 61 extending outward in the vehicle width direction from an outer end portion of the inclination portion 60 in the vehicle width direction. The horizontal part 53, the left and right vehicle body support parts 58, and the inclination portions 60 of the left and right outer end parts 59 of the front axle beam 50 are formed to have a substantially-shaped section by a pair of upper and lower horizontal plate parts SI having a substantial plate shape extending in the vehicle width direction (extension direction) with being spaced vertically from and facing each other and a vertical plate part 52 having a substantial plate shape, disposed between the upper and lower horizontal plate parts 51 and erected along the vehicle width direction to couple the upper and lower horizontal plate parts 51.

As shown in FIG. 8, an upper end edge of the vertical plate part 52 continues from a lower surface of an upper horizontal plate part 51a of the horizontal part 53. The upper horizontal plate part 51a of the horizontal part 53 has an upper front plate part 54 extending forward from the vertical plate part 52, and an upper rear plate part 55 extending rearward from the vertical plate part 52. An upper surface (a surface opposite to the vertical plate part 52) of the upper horizontal plate part 51a of the horizontal part 53 has the highest apex portion at a substantially central portion in the front and rear direction, and is inclined front-downward and rear-downward from the apex portion. A lower surface (a surface facing the vertical plate part 52) of the upper front plate part 54 extends front-upward from the vertical plate part 52. A lower surface (a surface facing the vertical plate part 52) of the upper rear plate part 55 extends rear-upward from the vertical plate part 52. A lower end edge of the vertical plate part 52 continues from an upper surface of a lower horizontal plate part 51b of the horizontal part 53. The lower horizontal plate part 51b of the horizontal part 53 has a lower front plate part 56 extending forward from the vertical plate part 52 and a lower rear plate part 57 extending rearward from the vertical plate part 52. A lower surface (a surface opposite to the vertical plate part 52) of the lower horizontal plate part 51b of the horizontal part 53 has the lowest apex portion at a substantially central portion in the front and rear direction, and is inclined front-upward and rear-upward from the apex portion. An upper surface (a surface facing the vertical plate part 52) of the lower front plate part 56 extends front-downward from the vertical plate part 52. An upper surface (a surface facing the vertical plate part 52) of the lower rear plate part 57 extends rear-downward from the vertical plate part 52. A front surface 52a of the vertical plate part 52 extends with being curved rearward from a rear end edge of the upper front plate part 54 toward a rear end edge of the lower front plate part 56. A rear surface 52b of the vertical plate part 52 extends with being curved forward from a front end edge of the upper rear plate part 55 toward a front end edge of the lower rear plate part 57.

Subsequently, a cross-sectional shape of the horizontal part 53 is described with reference to FIGS. 7 and 8. FIG. 8 is a sectional view of the front axle beam 50 taken at any position in a direction orthogonal to the vehicle width direction. The horizontal part 53 is formed to have a substantially I-shaped section by the pair of upper and lower horizontal plate parts 51 having a substantial plate shape extending in the vehicle width direction with being spaced vertically from and facing each other and the vertical plate part 52 having a substantial plate shape, disposed between the upper and lower horizontal plate parts 51 and erected along the vehicle width direction to couple the upper and lower horizontal plate parts 51. A length (an amount that protrudes forward from the vertical plate part 52) L5 in the front and rear direction of the upper front plate part 54 and a length (an amount that protrudes rearward from the vertical plate part 52) L8 in the front and rear direction of the lower rear plate part 57 are set to be substantially the same. A length (an amount that protrudes rearward from the vertical plate part 52) L6 in the front and rear direction of the upper rear plate part 55 and a length (an amount that protrudes forward from the vertical plate part 52) L7 in the front and rear direction of the lower front plate part 56 are set to be substantially the same. The length L5 in the front and rear direction of the upper front plate part 54 and the length L8 in the front and rear direction of the lower rear plate part 57 are set to be shorter than the length L6 in the front and rear direction of the upper rear plate part 55 and the length L7 in the front and rear direction of the lower front plate part 56. Also, since each length of the length L5 in the front and rear direction of the upper front plate part 54, and the length L8 in the front and rear direction of the lower rear plate part 57 are set to be shorter than each length of the length L6 in the front and rear direction of the upper rear plate part 55, and the length L7 in the front and rear direction of the lower front plate part 56, a deformation mode of torsion deformation of the horizontal part 53 of the axle beam 50 is different from a case where each length of the length L5 in the front and rear direction of the upper front plate part 54, and the length L8 in the front and rear direction of the lower rear plate part 57 are set to be substantially the same as each length of the length L6 in the front and rear direction of the upper rear plate part 55, and the length L7 in the front and rear direction of the lower front plate part 56.

According to the present embodiment, the front axle beam 50 has the left and right wheel support parts 61 that support the front wheels 5, and the left and right vehicle body support parts 58 that are provided between the left and right wheel support parts 61 and support the vehicle body from below. Therefore, during the sudden vehicle braking, when the vehicle body-side may be moved forward due to the inertia with respect to the decelerating front wheels 5-side, the forward load is input to the vehicle body support parts 58 of the front axle beam 50. The lengths L5 and L8 in the front and rear direction of the upper front plate 54 and the lower rear plate part 57 provided diagonally to the upper and lower horizontal plate parts 51 of the front axle beam 50 are set to be shorter than the lengths L6 and L7 in the front and rear direction of the upper rear plate part 55 and the lower front plate part 56. Therefore, the cross-sectional shape of the front axle beam 50 is asymmetrical in the front and rear direction. As a result, during the sudden vehicle braking, the front axle beam 50 can be easily curved such that the center-side of the front axle beam 50 in the vehicle width direction protrudes obliquely-upper-forward along a diagonal line between the upper front plate part 54 and the lower rear plate part 57. For this reason, when the front axle beam 50 is curved such that the center-side thereof in the vehicle width direction protrudes obliquely-upper-forward, displacement in the front and rear direction of the relative position between the vehicle body support part 58 and the wheel support part 61 is smaller, as compared to a case where the front axle beam 50 is curved such that the center-side thereof in the vehicle width direction protrudes forward substantially horizontally. Therefore, in the vehicle 1 where the steering device 6 is operated to move the other end-side of the left knuckle arm 22L in the front and rear direction, thereby steering the front wheels 5 right and left, during the sudden vehicle braking, displacement in the front and rear direction of the relative position between the vehicle body and the front wheels 5 can be reduced. As a result, it is possible to suppress the steering of the wheels due to deformation of the front axle beam 50.

Also, in a vehicle including an automatic brake system, a driver's unintentional sudden braking may occur and a driver's correction of a wheel direction may be delayed. Therefore, a system for correcting the wheel direction during the sudden vehicle braking is provided, which may make the system complicated. According to the present disclosure, during the sudden braking by the automatic brake system, the driver's unintentional steering for the front wheels 5 is suppressed. Therefore, it is possible to avoid the situation where the system is complicated, such as a case where a system for correcting the direction of the front wheel 5 is provided.

Also, since the lengths L5 and L8 in the front and rear direction of the upper front plate 54 and the lower rear plate part 57 are set to be shorter than the lengths L6 and L7 in the front and rear direction of the upper rear plate part 55 and the lower front plate part 56, during the sudden vehicle braking, the front axle beam 50 can be easily curved such that the center-side thereof in the vehicle width direction protrudes obliquely-upper-forward along the diagonal line between the upper front plate part 54 and the lower rear plate part 57. For this reason, during the sudden vehicle braking, when the downward load is input from the vehicle body-side to the vehicle body support parts 58 of the front axle beam 50, the downward curving amount (bending) of the center-side of the front axle beam 50 in the vehicle width direction can be suppressed, so that variations in camber angle of the left and right front wheels 5 attached to the wheel support parts 61 of the front axle beam 50 can be suppressed. Therefore, during the sudden vehicle braking, it is possible to suppress the lowering in straight traveling stability of the vehicle 1 due to the variations in camber angle of the left and right front wheels 5.

Also, since the length L5 in the front and rear direction of the upper front plate part 54 and the length L8 in the front and rear direction of the lower rear plate part 57 are set to be shorter than the length L6 in the front and rear direction of the upper rear plate part 55 and the length L7 in the front and rear direction of the lower front plate part 56, a weight can be reduced by the shortened portion. Also, when a thickness of the axle beam 50 is increased by the reduced weight, it is possible to reduce lowering in vertical bending stiffness of the horizontal part 53 of the front axle beam 50 and to increase bending stiffness in the front and rear direction, as compared to a case where the length L5 in the front and rear direction of the upper front plate part 54 and the length L8 in the front and rear direction of the lower rear plate part 57 are set to be substantially the same as the length L6 in the front and rear direction of the upper rear plate part 55 and the length L7 in the front and rear direction of the lower front plate part 56.

Additionally, in the present embodiment, the following structure has been exemplified: the lengths in the front and rear direction of the upper front plate part 54 and the lower rear plate part 57 of the front axle beam 50 are set to be substantially the same; the lengths in the front and rear direction of the upper rear plate part 55 and the lower front plate part 56 are set to be substantially the same; and the lengths in the front and rear direction of the upper front plate part 54 and the lower rear plate part 57 are set to be shorter than the lengths in the front and rear direction of the upper rear plate part 55 and the lower front plate part 56. However, the present invention is not limited thereto. For example, the following structure is also possible: the lengths in the front and rear direction of the upper front plate part 54 and the lower rear plate part 57 of the front axle beam 50 are set to be substantially the same; the lengths in the front and rear direction of the upper rear plate part 55 and the lower front plate part 56 are set to be substantially the same; and the lengths in the front and rear direction of the upper rear plate part 55 and the lower front plate part 56 are set to be shorter than the lengths in the front and rear direction of the upper front plate part 54 and the lower rear plate part 57.

Also, in the present embodiment, the following structure of the cross-sectional shape of the horizontal part 53 of the axle beam 50 has been exemplified: the lengths L5 and L8 in the front and rear direction of the upper front plate part 54 and the lower rear plate part 57 are set to be substantially the same; the lengths L6 and L7 in the front and rear direction of the upper rear plate part 55 and the lower front plate part 56 are set to be substantially the same; and the lengths L5 and L8 in the front and rear direction of the upper front plate part 54 and the lower rear plate part 57 are set to be shorter than the lengths L6 and L7 in the front and rear direction of the upper rear plate part 55 and the lower front plate part 56. However, the present invention is not limited thereto. For example, the structure may also be a cross-sectional shape of the horizontal part 53 and the vehicle body support part 58 of the axle beam 50.

Although the present invention has been described with reference to the embodiments, the present invention is not limited to the contents of the embodiments and can be appropriately changed without departing from the present invention. That is, other embodiments, examples, operating technologies and the like made based on the above embodiments by one skilled in the art are all included in the scope of the present invention.

The subject application is based on Japanese Patent Application No. 2018-040701 filed on Mar. 7, 2018, the contents of which are incorporated herein by reference.

INDUSTRIAL APPLICABILITY

The present invention can be used to suppress steering of the wheels due to displacement of the relative position between the vehicle body-side and the wheel-side during the sudden vehicle braking.

REFERENCE SIGNS LIST

1: vehicle
2: vehicle body frame (vehicle body)
3: leaf suspension

4: front axle
5: front wheel (wheel)
6: steering device
11: leaf spring
20, 50: front axle beam (axle beam)
21: knuckle
21 R: right knuckle
21L: left knuckle
22: knuckle arm
22R: right knuckle arm
22L: left knuckle arm
23: link rod
24, 51: horizontal plate part
25, 52: vertical plate part
26, 53: horizontal part
27, 58: vehicle body support part
28, 59: outer end part
30, 54: upper front plate part
31, 55: upper rear plate part
32, 56: lower front plate part
33, 57: lower rear plate part
34: spring seat part
36, 60: inclination portion
37, 61: wheel support part
40: beam attachment part
41: wheel attachment part
42: upper attachment part
43: lower attachment part
45: arm attachment part
46: steering gear box
47: pitman arm
48: drag link
49: kingpin

The invention claimed is:

1. An axle beam having left and right wheel support parts configured to support wheels, and left and right vehicle body support parts provided between the left and right wheel support parts and configured to support a vehicle body from below, and extending in a vehicle width direction below the vehicle body, the axle beam comprising:

a pair of horizontal plate parts extending in the vehicle width direction between the left and right vehicle body support parts with being spaced vertically from and facing each other; and a vertical plate part extending in the vehicle width direction between the pair of horizontal plate parts and extending vertically so as to couple intermediate portions in a front and rear direction of the pair of horizontal plate parts, wherein the pair of horizontal plate parts have an upper horizontal plate part and a lower horizontal plate part, wherein the upper horizontal plate part has an upper front plate part extending forward from the vertical plate part and an upper rear plate part extending rearward from the vertical plate part, wherein the lower horizonal plate part has a lower front plate part extending forward from the vertical plate part and a lower rear plate part extending rearward from the vertical plate part, wherein the upper front plate part has a length in the front and rear direction smaller than each length of the upper rear plate part, the lower front plate part, and the lower rear plate part, wherein the upper rear plate part and the lower rear plate part have substantially a same length in the front and rear direction, and wherein a thickness of the vertical plate part is thicker than each thickness of the upper front plate part, the upper rear plate part, the lower front plate part, and the lower rear plate part.

* * * * *